United States Patent
Tesler et al.

(10) Patent No.: US 7,987,171 B2
(45) Date of Patent: *Jul. 26, 2011

(54) PROVIDING PARALLEL GENERIC WEB SITE SUPPORTING ANONYMOUS OR SEMI-ANONYMOUS INTERNET ACTIVITY

(75) Inventors: Joel D. Tesler, Cupertino, CA (US); Ruben E. Ortega, Seattle, WA (US); Jonathan A. Leblang, Menlo Park, CA (US)

(73) Assignee: A9.com, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/705,458

(22) Filed: Feb. 12, 2010

(65) Prior Publication Data
US 2010/0146400 A1    Jun. 10, 2010

Related U.S. Application Data

(63) Continuation of application No. 10/967,025, filed on Oct. 14, 2004, now Pat. No. 7,693,841.

(51) Int. Cl.
G06F 17/30    (2006.01)
(52) U.S. Cl. .................. 707/706; 707/707; 707/771
(58) Field of Classification Search .................. None
See application file for complete search history.

(56) References Cited

U.S. PATENT DOCUMENTS

| | | | |
|---|---|---|---|
| 5,948,061 A | 9/1999 | Merriman | |
| 6,594,638 B1 * | 7/2003 | Feldman et al. | 705/14.14 |
| 7,069,319 B2 | 6/2006 | Zellner | |
| 7,213,032 B2 | 5/2007 | Mascarenhas | |
| 7,280,819 B2 | 10/2007 | Engelhart | |
| 7,568,200 B2 * | 7/2009 | Weiss | 718/106 |
| 2001/0034709 A1 | 10/2001 | Stoifo | |
| 2003/0080997 A1 | 5/2003 | Fuehren | |
| 2004/0098625 A1 | 5/2004 | Lagadec | |
| 2004/0162056 A1 * | 8/2004 | Engelhart | 455/411 |
| 2005/0257250 A1 | 11/2005 | Mitchell | |

* cited by examiner

*Primary Examiner* — Baoquoc To
(74) *Attorney, Agent, or Firm* — Kilpatrick Townsend and Stockton LLP

(57) ABSTRACT

Parallel generic and non-generic versions of a Web site allow a user of the site to either remain anonymous (if accessing the generic version) or allow user information to be collected (if accessing the non-generic version). In one exemplary embodiment, a Web site may provide a user an interface for entering and processing a search query. A search query processed by a generic version of the Web site includes a marker that informs a Web server supporting the generic Web site that the user wishes to remain anonymous. A parallel non-generic version of the Web site may also interface with the same Web server as interfaced by the generic Web site, but permit a data collecting scheme at the Web server to collect user-specific or user-identifiable information. Such user information, if collected, can be used by the Web server to enhance the user's experience with the Web site.

23 Claims, 9 Drawing Sheets

PROVIDING PARALLEL GENERIC WEB SITE SUPPORTING ANONYMOUS OR SEMI-ANONYMOUS INTERNET ACTIVITY

FIELD OF THE INVENTION

The present invention generally relates to the exchange of information over a computer network, and more particularly, to the collection and use of user-related information.

BACKGROUND OF THE INVENTION

The World Wide Web ("WWW") is a multimedia-enabled hypertext system used for exchanging information via the Internet. The WWW is capable of exchanging nearly any type of data that may be stored on computers, and may be accessed using an Internet connection and a WWW browser. The WWW is made up of domains at which millions of interconnected pages or documents are available for retrieval and display on a computer monitor. Each page can have connections to other pages that may be retrieved using any computer connected to the Internet.

The WWW is based on the concept of hypertext, which is very similar to ordinary text, except in the case of hypertext, connections to other parts of the text or to other documents may be associated with words, phrases, and graphics in the text. These associated types of connections are frequently referred to as hypertext links. These hypertext links essentially allow a user to access a document in its entirety or in part in various different manners. The WWW may also utilize hypertext links to retrieve pictures, sounds, and any other data files that may be stored on a computer.

At the present time, a hypertext link is typically presented in the form of a uniform resource locator (URL). URLs enable a WWW browser to go directly to files that are stored or generated dynamically on a particular WWW server. URLs typically include at least three parts: a transfer format (also known as a protocol type), a host name of the machine that holds a requested file (may also be referred to as a domain or WWW server name), and a path name to the file. The transfer format for a standard WWW page is hypertext transfer protocol (HTTP). Standard Internet naming conventions are utilized for the host name portion of the URL. In addition, UNIX® directory naming conventions are utilized to indicate the path name of a file.

FIGS. 1 and 2 illustrate conventional arrangements for accessing the Internet's WWW using a Web browser. Referring to FIG. 1, a computer 100 is shown being used as a Web client. The figure further shows a network cloud 102 that is generally designated as the WWW. The network cloud 102 includes a plurality of computers 104 that are capable of functioning as one or more Web servers. The computers 104 are generally designated as a network of computers.

The computer 100 may include a conventional Web browser 106 operating within the computer 100. The Web browser 106 in conjunction with a display device of the computer 100 is capable of displaying text 108 and/or pictures 110 forming a Web page. The text 108 and the picture 110 (i.e., the Web page) may be retrieved by entering a URL 112 using an interface of the Web browser 106. The URL 112 may be entered manually into the Web browser 106, or also may be entered by way of selecting a hypertext link associated with a Web page displayed using the Web browser 106.

FIG. 2 illustrates a computer 200 that includes at least a CPU 202 and a memory 204. The memory 204 may be a combination of both volatile and nonvolatile memory. The computer 200 includes at least an operating system 206, such as Microsoft Windows®, and a Web browser 208, such as the Microsoft® Internet Explorer®. As is illustrated in FIG. 2, the computer 200 is generally representative of a Web client.

FIG. 2 further illustrates a network cloud 210 having associated therewith various computers 212. These computers 212 are networked together and one or more thereof may be used as a Web server. The network cloud 210 illustrated in FIG. 2 is designated as the WWW.

Similar to that which was described in connection with FIG. 1, the Web browser 208 may be used by a user to enter a URL 214. This may be done manually or by way of a link associated with a Web page displayed on the Web browser 208. The URL 214 is used by the computer 200 to access and retrieve data which is stored on one of the Web servers shown in the network cloud 210.

In a standard implementation, a WWW Web server is provided with a request for data and the IP address of a Web client requesting the data. The Web server provides the requested data to the Web client associated with the IP address.

Some Web servers provide a "cookie" to the client's Web browser upon interaction between a Web site at the Web server and the client's Web browser. A cookie is a collection of information that the Web server stores in the memory of the Web client and can be accessed by the Web server to retrieve and update information about the user each time the user visits the Web site. A cookie typically includes the address of the server that sent it, and the Web browser generally only allows the Web server that created the cookie to access the cookie stored in the Web client.

Cookies can be used as part of a data collecting scheme to store a variety of information including information about the Web pages that the Web client has accessed in a particular visit to a Web site. For Web sites that require registration, for example, a cookie may hold a user name and password. The Web server may use the cookie information to tailor the Web site information to the user operating the Web client.

In many cases, a user of a Web client is not aware that the information is being maintained and collected by the cookies stored by the Web client. In some cases, a user of a Web client may not desire the sharing of information with Web servers via cookies.

SUMMARY OF THE INVENTION

Generic access to a Web site is provided such that a user of the site can remain anonymous. The generic Web site may be a site that provides a user thereof an interface for entering and processing information. One example of a Web site described herein provides services for searching the Web. Queries processed by the generic Web site include a marker that is recognized by a search Web server associated with the generic Web site. This marker informs the Web server that the user wishes to remain anonymous. Thereafter, while the marker is present, the Web server does not collect user information as part of a data collecting scheme. On the other hand, user information collected by a non-generic version of the Web site may be used by the Web server to tailor Web services and enhance the user's WWW experience. That is, the Web server may collect and store user information as part of a data collecting scheme if the marker is not present. Thus, the Web server may support two similar or parallel Web sites: one that operates in a generic manner and another that operates in a non-generic manner.

According to one exemplary embodiment of the present invention, a method includes receiving a query request; recognizing the query request includes a marker indicating an originator of the query request is to remain anonymous; and processing the query request, wherein the processing of the query request does not use information associated with the originator as part of a data collecting scheme.

According to another exemplary embodiment of the present invention, a system includes a Web server designed to handle query requests, the Web server capable of analyzing a query request to determine if a marker is associated therewith, and if the marker is associated therewith, the query request is processed without using information associated with an originator of the request as part of a data collecting scheme.

According to yet another exemplary embodiment of the present invention, a method provides at least two front end interfaces associated with a common back end server. The back end server does not utilize a data collecting scheme when the first of the at least two front end interfaces is used to access the back end server. When the second of the at least two front end interfaces is used to access the back end server, the back end server can utilize a data collecting scheme.

BRIEF DESCRIPTION OF THE DRAWINGS

The foregoing aspects and many of the attendant advantages of exemplary embodiments of the present invention will become more readily appreciated as the same become better understood by reference to the following detailed description, when taken in conjunction with the accompanying drawings, wherein.

DETAILED DESCRIPTION

Exemplary embodiments of the present invention are described in relation to a method, system, and application program that provide a user an advantageous implementation for accessing and using computer network sites in an anonymous manner. The exemplary embodiments of the present invention are preferably implemented using a computer-related system that is connected to a network of other computers and/or server devices or server platforms. The exemplary embodiments of the present invention may, however, be implemented using other types of computer systems not described in detail herein. Therefore, the description of the exemplary embodiments in conjunction with the figures provided herewith should not be construed as limiting the scope of the present invention.

Introduction

The following description first provides a background description of basic Internet searching technology. This description is aided by referencing FIGS. 1-4. Next, various Web browser screens and computer systems will be described relative to exemplary embodiments of the invention. This description will reference FIGS. 5, 7 and 8. A method according to an exemplary embodiment of the present invention will be described in connection with FIGS. 6A and 6B. While the exemplary embodiments of the present invention are shown herein in relation to Internet searching, the principles of the invention may be applied to any form of computer site providing information or services.

Internet Searching

Figure 1:
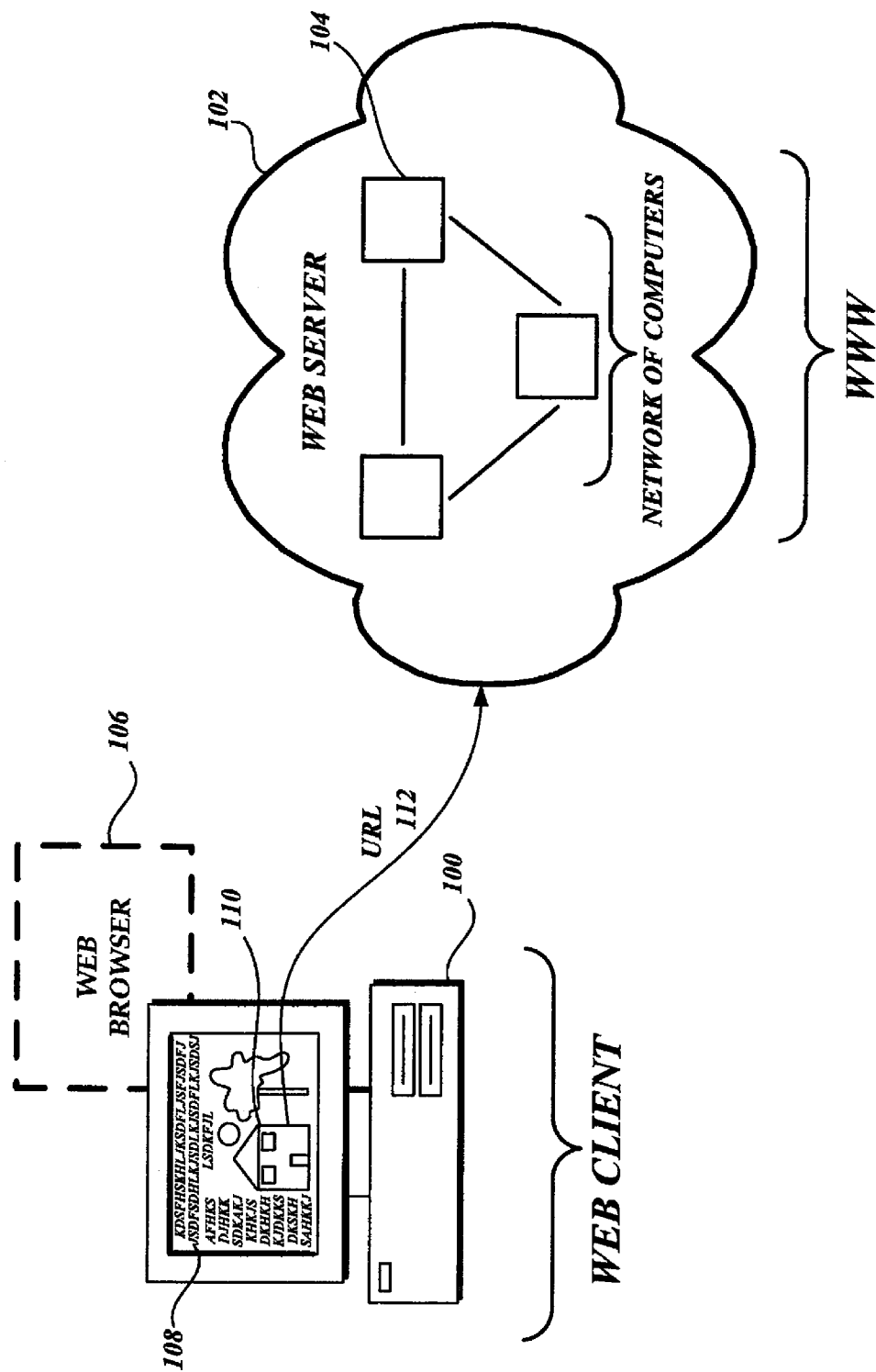
FIGS. 1 and 2 illustrate conventional arrangements for accessing the Internet's World Wide Web ("WWW") using a Web browser.
Figure 2:
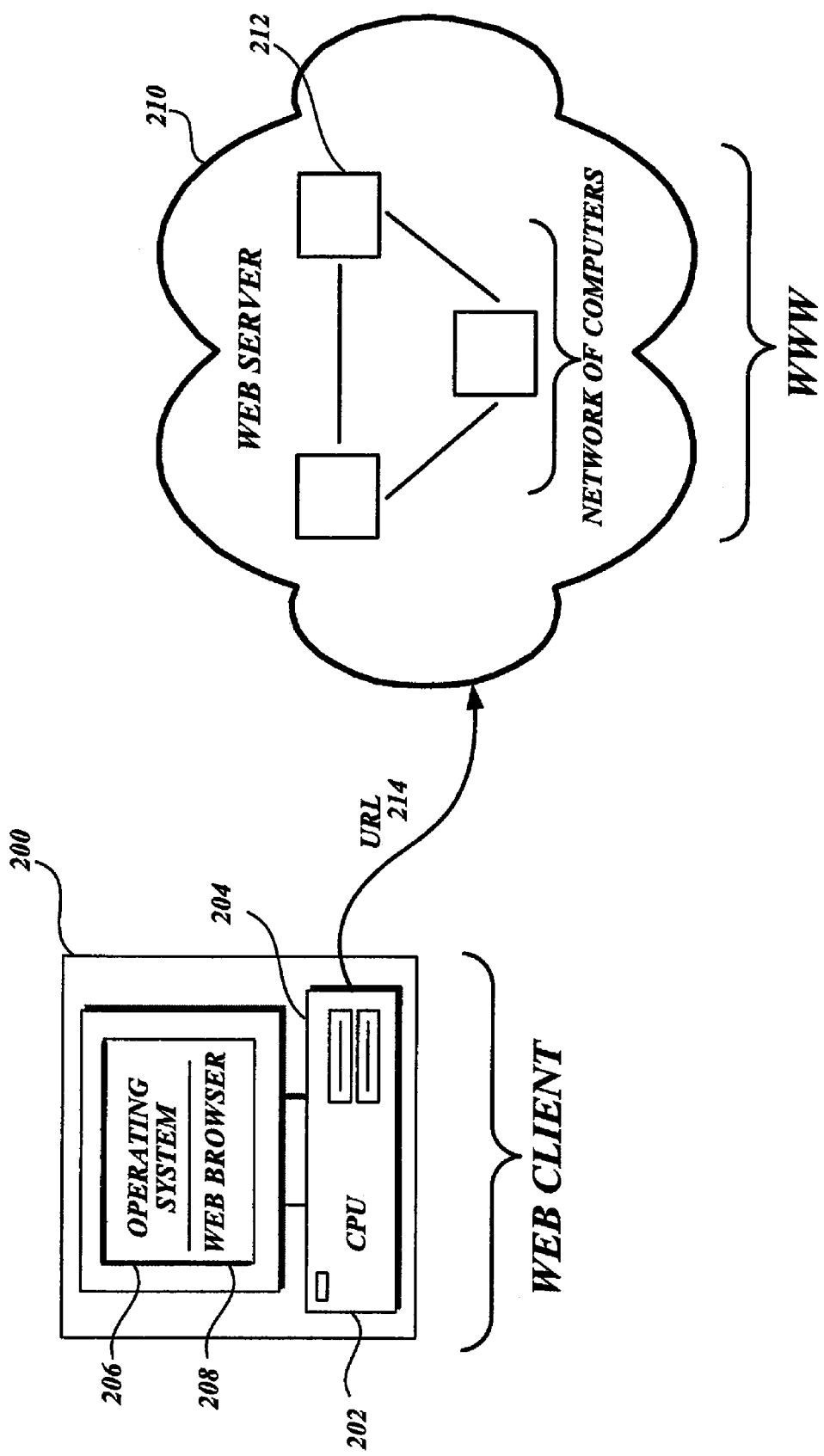
Figure 3:
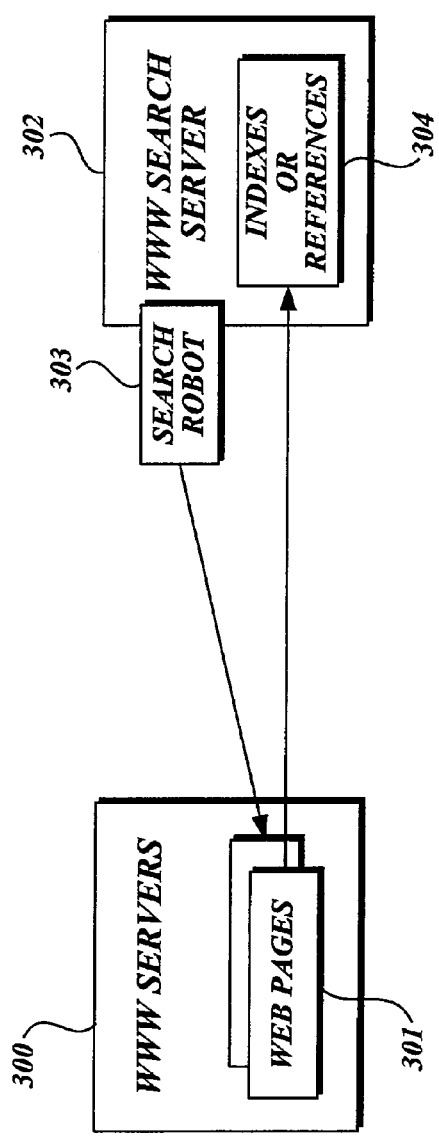
FIG. 3 illustrates an Internet searching arrangement that may be used in conjunction with exemplary embodiments of the present invention.

FIG. 3 illustrates an Internet searching arrangement that may be used in conjunction with an exemplary embodiment of the present invention. At least one World Wide Web ("WWW") server 302 includes at least one search robot 303 that periodically circulates among various interconnected WWW servers 300 in order to visit various Web pages 301 that may be stored in computers geographically located around the globe. The WWW search server 302 analyzes the contents of the Web pages 301 and builds indexes or references 304 that are stored on the WWW search server 302. These indexes or references 304 store relevant information about the Web pages 301 that are located on the various WWW servers 300. The indexes or references 304 may include a summary of the uniform resource locators (URLs) for the Web pages 301 on the WWW servers 300.

Figure 4:
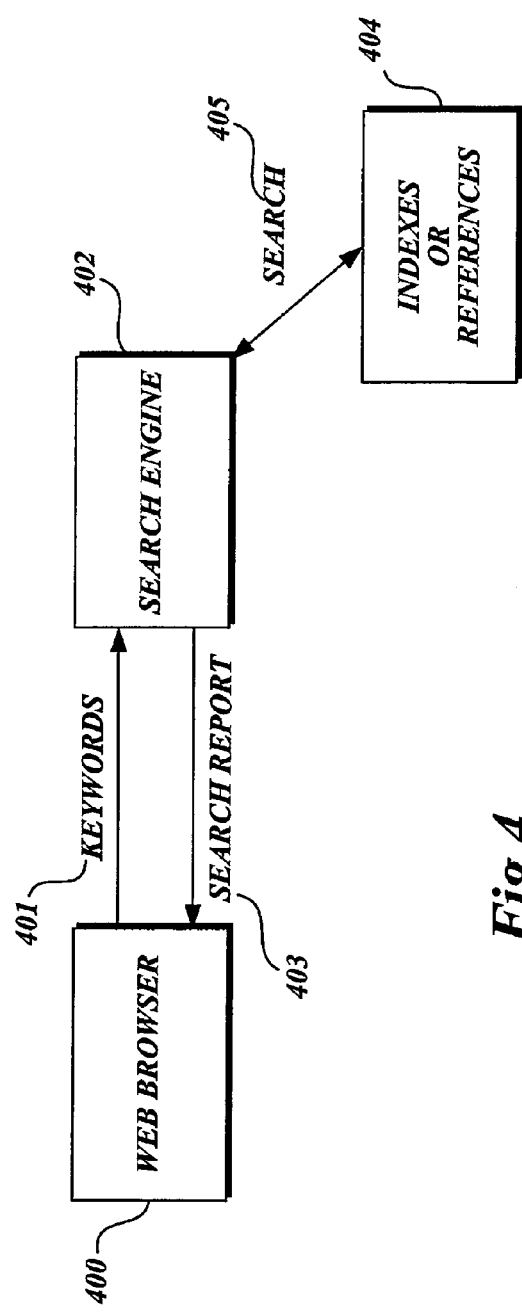
FIG. 4 illustrates a Web browser in communication with a search engine for searching the Internet.

FIG. 4 illustrates a Web browser 400 in communication with a search engine 402 for searching the Internet. When using WWW search engines, or WWW search servers, a user conducting a Web search may contact one or more WWW search servers by way of the Web browser 400. Using the Web browser 400, keywords 401 may be communicated to the search engine 402. These keywords 401 represent the type of information desired by a user of the Web browser 400. Using these keywords 401, the search engine 402 searches previously generated indexes or references 404 for information related to the entered keywords 401. Based on a search 405 of the indexes or references 404 by the search engine 402, a search report 403 is returned to the Web browser 400 for viewing by the user.

Exemplary Computer System

Figure 5:
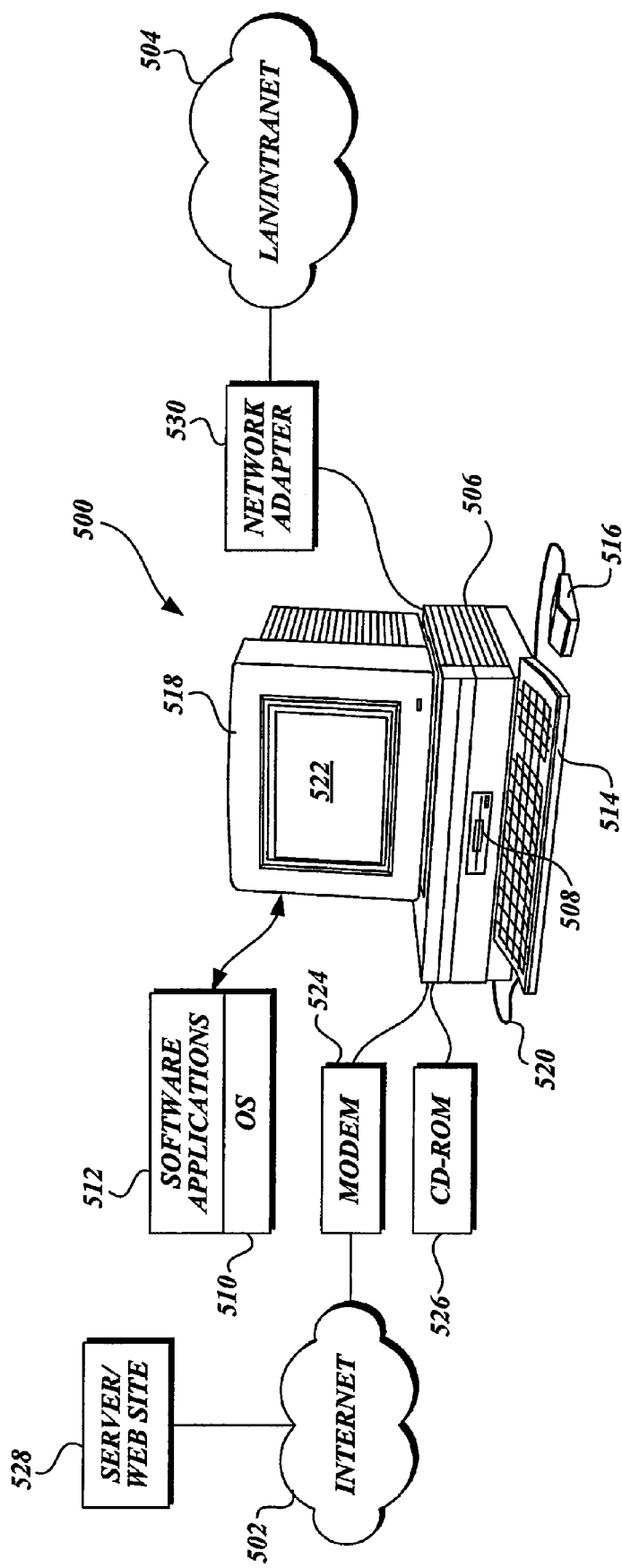
FIG. 5 illustrates an exemplary networked computer system that may be used in conjunction with exemplary embodiments of the present invention.

FIG. 5 illustrates an exemplary networked computer system 300 that may be used in conjunction with exemplary embodiments of the present invention. The computer system 500 is connected to the Internet 502 and may also be connected to an intranet network 504. The computer system 500 generally includes a central processing unit (CPU) housed in a casing 506 (collectively referred to herein as a processor). The processor 506 also holds various hardware components including a disk drive 508, and various memory devices (not shown). Stored within the memory devices are the operating system (OS) 510 and software applications 512. In this embodiment, the software applications 512 may include a Web browser application. The OS 510 typically includes software for controlling the allocation and usage of hardware resources such as memory, CPU time, disk space and peripheral devices. The OS 510 therefore operates as a foundation upon which applications, such as the Web browser application, are built.

Several peripheral input/output (I/O) devices are shown connected to the processor 506. These I/O devices include a keyboard 514, a mouse 516, and a display monitor 518. The keyboard 514 is coupled to the processor 506 by way of a cable 520. The display monitor 518 includes a display screen 522, which may be implemented using a cathode ray tube (CRT), a liquid crystal display (LCD), an electrode luminescent panel or the like. The display monitor 518 is utilized to provide a graphical user interface (GUI) that allows user interaction with the software applications 512 and the OS 310. If desired, the mouse 516 may be implemented using a trackball, a joystick, touch sensitive tablet or screen, track pad, or the like. The mouse 516 may be used to move a pointer or cursor on the display screen 522.

The processor 506 may also be coupled to one or more peripheral devices such as a modem 524, a CD-ROM 526, and a network adapter 530. Each of the peripheral devices may be internal or external to the processor 506. Various other output devices, such as a printer (not shown), may also be coupled to the processor 506.

The computer system 500 is illustrated as being in communication with a local area network (LAN) or intranet 504. The computer system 500 is also illustrated as being in communication with the Internet 502, which permits access to WWW servers 528 that provide Web sites. The connection to the WWW servers 528 allows the computer system 500 to use a Web browser to download Web pages from the Web sites.

The computer system 500 is designed to provide a GUI by way of the OS 510 and the software applications 512. The OS 510 in conjunction with the software applications 512 may reside on computer readable medium to direct the operation of the computer system 500. Any suitable computer readable medium may hold the OS 510 and the software applications 512, such as RAM, ROM, FLASH memory, and/or other disk and/or tape drive (e.g., magnetic diskette, magnetic tape, CD-ROM, optical disk, or other suitable storage media). The computer readable medium may be non-volatile or volatile type storage. Also, any suitable OS may be used to direct the processing and general operation of the computer system 500.

Those skilled in the art will appreciate that the computer system 500 may be connected to the Internet 502 via proxies, or alternatively a LAN server (not shown). This and other exemplary functional environments may be used to implement embodiments of the present invention. Furthermore, exemplary embodiments of the present invention may be executed and used with and/or in a variety of systems, including a variety of computers having a number of different operating systems. These computers may be, for example, a personal computer, a network computer, a tablet computer, a handheld computer, a laptop computer, a server, a midrange computer, a mainframe computer, etc. In addition, the computer may be a stand-alone system or part of a network such as a LAN or a wide-area network (WAN). For the purposes of illustration, the exemplary embodiments of the present invention are described with reference to a computer system that is operationally connected to the Internet.

Exemplary Methods

Various methods according to exemplary embodiments of the present invention will now be described. Although in some instances specific hardware and interfaces described herein will be referenced in conjunction with the discussed methods, other arrangements may also be used to practice the present invention. A wide variety of computing devices and systems may be used, which include, but are not limited to, wireless devices, portable computing devices, personal computers, network computers, servers, and server platforms that may connect to networks via wire-line and/or wireless media.

The exemplary embodiments of the present invention operate and interface with a Web server that may provide information and/or services in association with one or more Web sites. In particular, the exemplary embodiments of the present invention support parallel access to generic and non-generic versions of a Web site. A generic Web site associated with the Web server allows a WWW user to remain anonymous. At the same time, the Web server supports a non-generic version of the Web site that does not allow users to remain anonymous. A non-generic Web site may collect and use information associated with a user, e.g., to enhance and personalize the user's interaction with the Web site.

A generic Web site in accordance with the exemplary embodiments of the present invention may appear substantially the same and/or provide substantially similar services as a non-generic Web site; however, the operational characteristics of the generic and non-generic Web sites are different (as described later herein). An entity may thus provide parallel Web sites for use by WWW users depending on the level of privacy desired. The generic Web site provides a front end, which may be a Web page, that interfaces with a back end Web server in a manner that substantially protects the privacy of the WWW user, where the non-generic Web site provides a front end that interfaces with the same Web server and the Web server is permitted to collect information related to the WWW user and/or tailor services for the WWW user.

The term "front end" is used broadly in this disclosure to refer to any apparatus, process, and data that are used to interface with users, typically interfacing a Web server with users via a network. Accordingly, in some respects, a front end may provide a Web page interface that allows users to enter information, data, and/or query requests and receive responses thereto. In addition, a front end may include information and/or data that are used to display a Web page on a Web browser. Furthermore, a front end may include computer hardware and/or software, such as program instructions and code, that can act on user query requests and data input to the front end by a user. It should be understood that references to "front end" herein are not necessarily limited to a Web page interface alone. It should also be understood that, in some embodiments, separate front ends may be used to provide generic and non-generic versions of a Web site, while in other embodiments, a single front end may be used to provide both a generic and non-generic version of the Web site. In the case of the latter, the single front end receives a query request from the user, employs software and/or hardware instructions to determine whether the query request comes with an indication that the user wishes to remain anonymous, and processes the query request accordingly. In that manner, a single front end (or two front ends, if desired) may provide two front end interfaces to a user, one for generic processing and one for non-generic processing of user queries. As should be understood from the description herein, the two front end interfaces may be similar or identical, but the manner in which user queries are processed is different, depending on the interface used to access the back end server.

Figure 7:
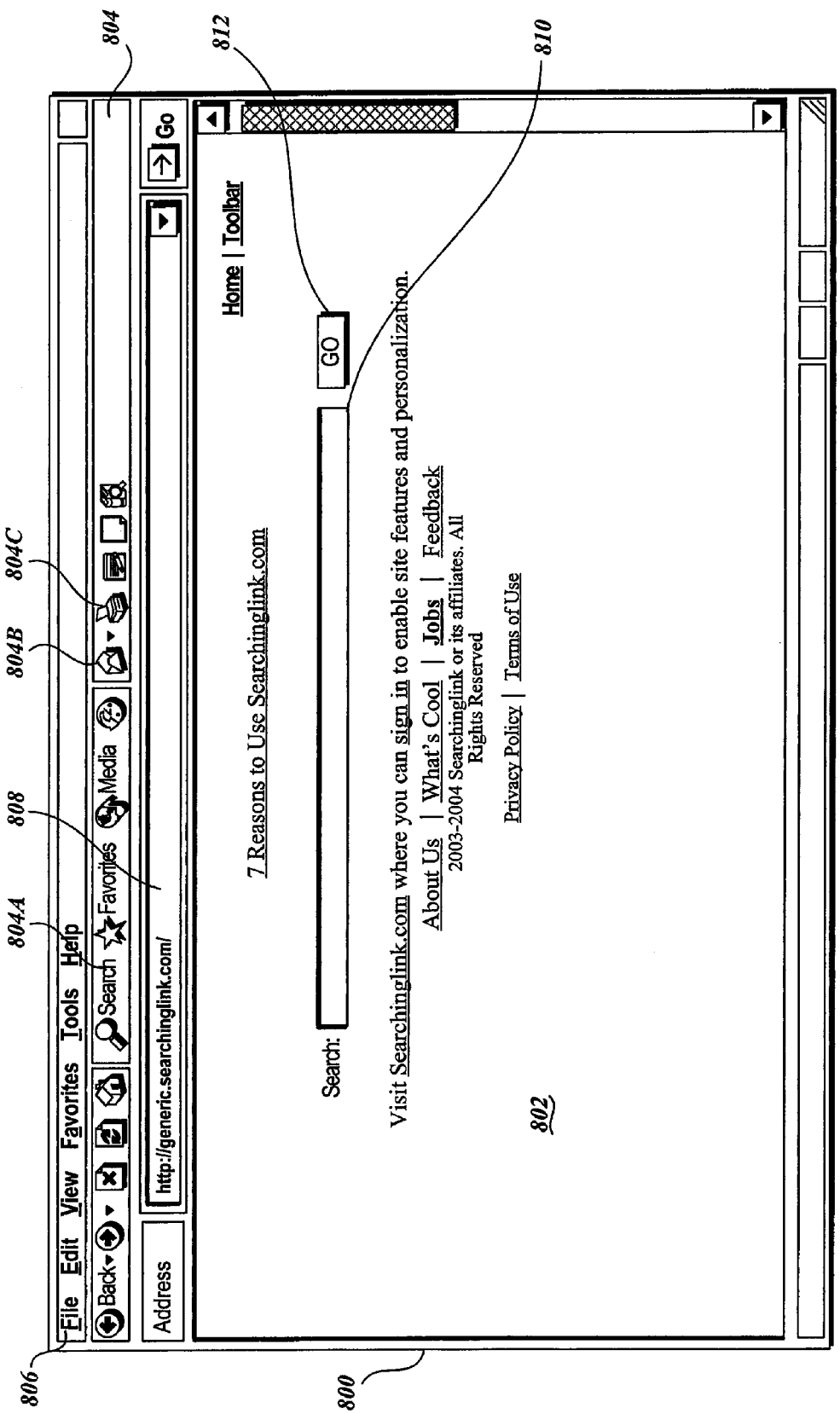
FIG. 7 illustrates a Web browser including a Web page that provides an interface or front end for a generic Web site in accordance with an exemplary embodiment of the present invention.
Figure 8:
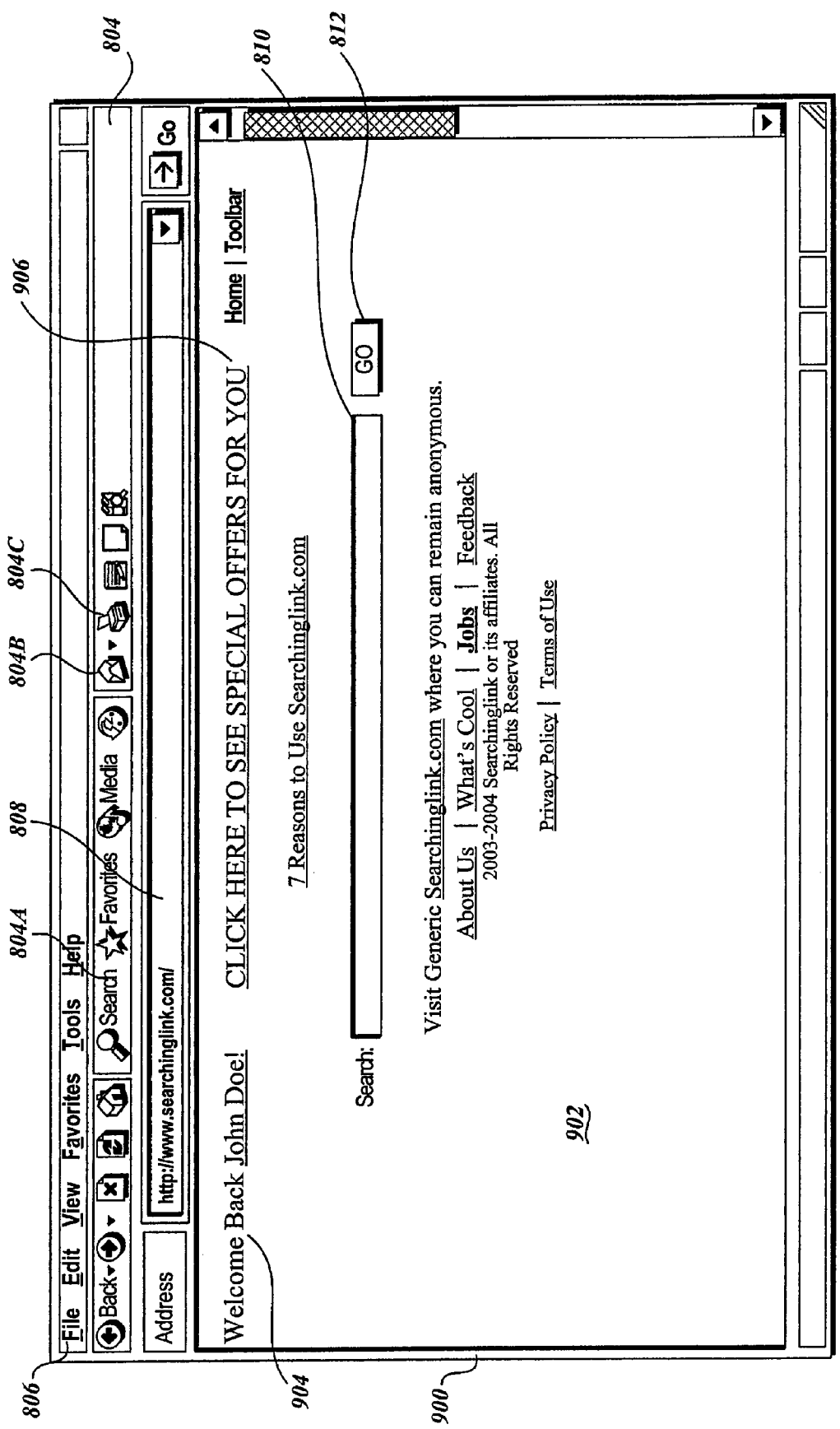
FIG. 8 illustrates a Web browser including a Web page that provides an interface or front end for a non-generic Web site in accordance with an exemplary embodiment of the present invention.

An example of a Web page provided by a generic Web site is illustrated in FIG. 7, and an example of a similar Web page provided by a parallel, non-generic Web site is illustrated in FIG. 8. These figures will be discussed in greater detail below.

As will be appreciated from the following description, methods of the present invention may be carried out in various ways. For example, methods of the present invention may be embodied in executable instructions using a computer programming language and stored on a computer readable medium for execution by a computing device.

Figure 6A:
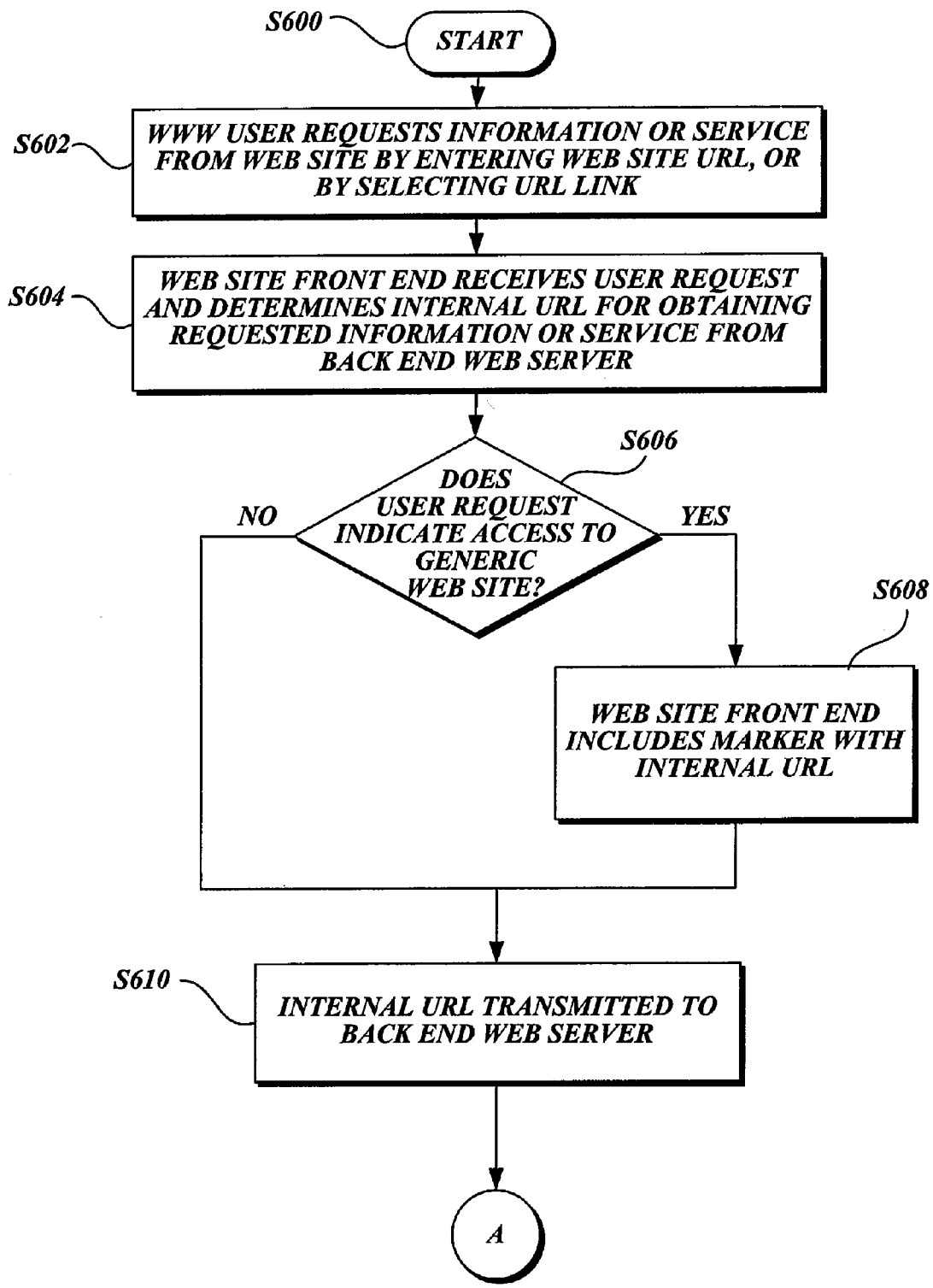
FIGS. 6A and 6B illustrate a method for accessing and using a Web site in accordance with an exemplary embodiment of the present invention.
Figure 6B:
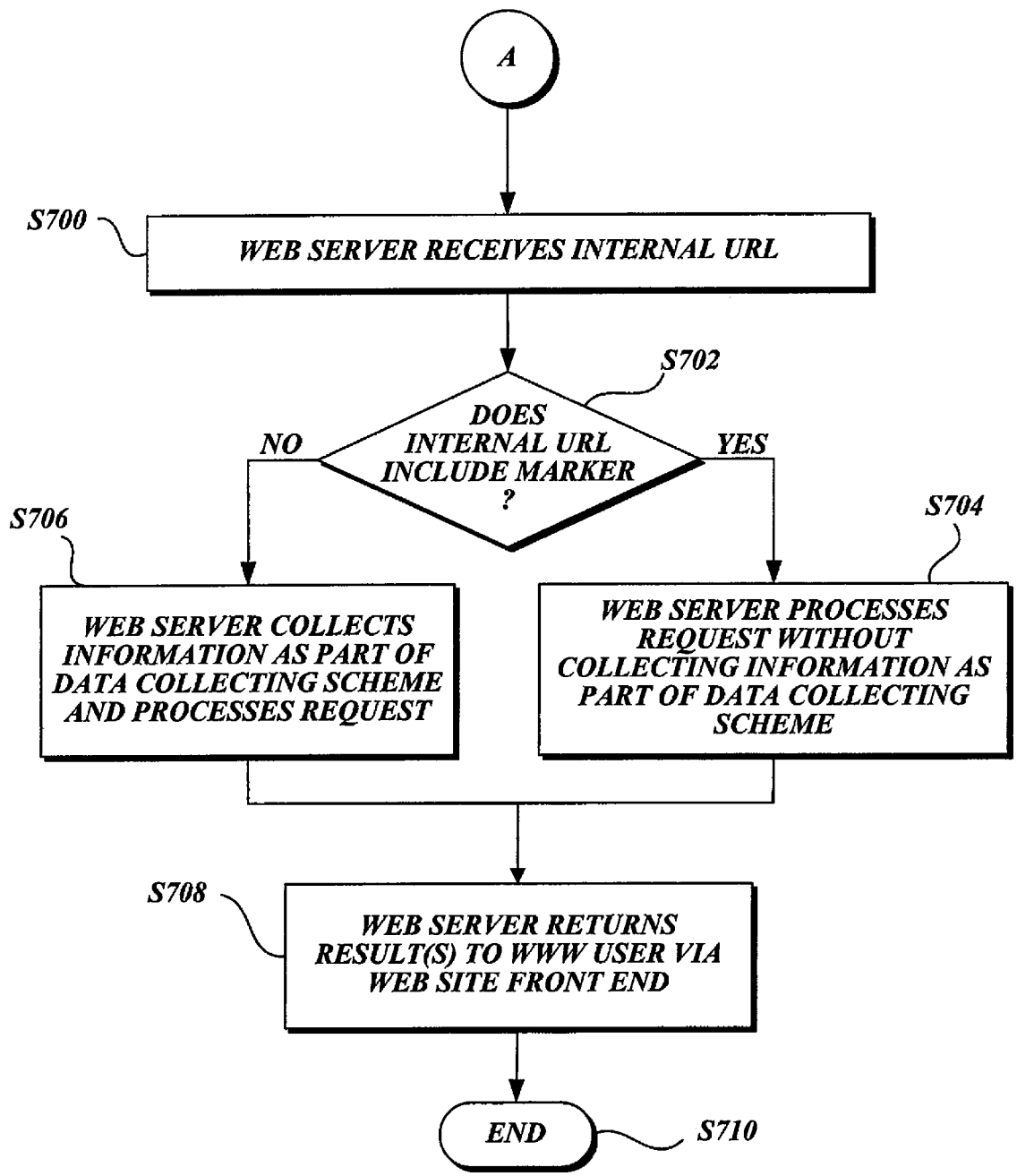

FIGS. 6A and 6B illustrate a method for accessing and using generic and non-generic versions of a Web site in accordance with one exemplary embodiment of the present invention. Block S600 represents the beginning of the processing of the method. At block S602, a user of the WWW may submit a query request for information or a service from a Web site by entering a URL associated with the Web site into a Web browser, or by selecting a URL link associated with the Web site. Processing of the request is then directed to the Web site front end operating on a computer identified by the URL. At block S604, the Web site front end receives the user's request and, in this embodiment, determines an internal URL. The Web site front end uses the internal URL to redirect processing to the back end Web server that provides the requested information or service. One example of an information or service provided by a Web server is a Web page. A Web page provided by a Web server a user's Web browser, such as the Web browser 208, may be displayed on display, such as the display screen 518, described earlier.

Before using the internal URL to redirect processing to the back end Web server, the Web site front end determines whether the user's query request indicates a desire to access a generic version of the Web site, as indicated at decision block S606. If the user's query request indicates access to a generic version of the Web site, the Web site front end includes a marker with the internal URL, as indicated at block S608. The marker serves to inform the back end Web server that the originator of the query request (i.e., the user in this example) wishes to remain anonymous. The internal URL with the marker is then transmitted and redirects processing to the back end Web server, as indicated at block S610. If the user's query request does not indicate a desire to access a generic version of the Web site, the processing proceeds from block S606 to block S610 in which the Web site front end transmits the internal URL without a "generic" marker to the back end Web server.

Turning now to FIG. 6B, at block S700, the back end Web server receives and processes the request initiated by the internal URL sent from the Web site front end. At decision block S702, the Web server determines whether the internal URL includes a marker indicating that the originator of the query request (here, the user) is accessing the generic version of the Web site, and thus desires to remain anonymous. If the internal URL includes a marker indicating "generic" access, the Web server proceeds to process the request received from the originating user without collecting information associated with the user as part of a data collecting scheme, as indicated at block S704. On the other hand, if the internal URL does not include a marker indicating "generic" access to the Web site, the Web server proceeds to collect information associated with the user as part of a data collecting scheme and processes the user's request, as indicated at block S706. The results of the processing are then returned to the user via the Web site front end, as indicated at block S708. The method then ends at block S710.

As previously noted herein, a Web server that collects information associated with the user is better able to personalize the information and services provided by the Web server to the requesting WWW user. However, when a user requests access to a generic version of the Web site, the Web server processes the query request without collecting user-identifiable information that may otherwise be collected. Generally, in one embodiment, this means that the Web server will not issue a cookie, nor will the Web server attempt to collect information associated with cookies that may be stored on the computer system that the WWW user is using. However, if at decision block S702 the query request does not include a "generic" marker, the Web server will process the query request and collect information related to the user.

The term "anonymous" as used herein generally means that information associated with the WWW user, e.g., user-specific or user-identifiable information, will not be collected by the Web server. For example, if the user access a generic version of a Web site, the Web server supporting the Web site may refrain from collecting, retaining, and/or using information such as the user's name, address, computer identification, account identification, IP address, and/or other user information. The term anonymous may further indicate that a user's use of the Web site is not tracked and/or statistically monitored by the Web server in order to tailor the information or services provided to the user. The term anonymous does not necessarily exclude the Web server from collecting certain information that may be used to monitor usage of the Web site for fraud, for example, or to change the aesthetic aspects of a Web site interface, or for other reasons, which persons of ordinary skill in this technology and others may consider to be substantially anonymous. For example, a Web server may temporarily observe user click streams or purchase patterns to identify fraudulent activity, or based on preferences of a WWW user, the Web server may operate to modify color, text style/size, background color/imaging, etc. of a Web site interface. A user's access of a generic version of a Web site may be substantially anonymous and still qualify as being anonymous as that term is used herein.

FIG. 7 illustrates a Web browser 800 including a Web page 802 that provides an interface or front end for a generic Web site in accordance with an exemplary embodiment of the present invention. The Web browser 800 is a GUI that is displayable on the display monitor 518 of the computer system 500. The Web browser 800 is shown including a number of selection buttons 804, such as a search button 804A, a mail button 804B, a print button 804C, etc. The operation of the buttons 804A, 804B, and 804C, and other buttons and controls shown in FIG. 7, is understood by those having ordinary skill in the art and need not be described in detail herein.

The Web browser 800 also includes a number of menu selection items 806 along with a URL address field 808. The URL displayed in the URL address field 808, which in this case is the URL for the generic Web site, normally represents an address of the Web page 802 that is displayed within the display space of the Web browser 800. The Web page 802 illustrated in FIG. 7 has a search field 810. A user of the Web page 802 may enter text into the search field 810 in preparation for processing a search query. To commence searching for URL links related to text entered into the search field 810, a user may activate a GO button 812 provided on the Web page 802.

In this particular embodiment, when a query is processed by the generic Web site, a marker is included with the query so that the Web server receiving the query will know that the WWW user wishes to remain anonymous. For example, the WWW user may enter the search keyword "tiger" in the search field 810 and select the GO button 812. In response, Web site front end may include parameters "?q=tiger&generic=1" in an internal URL query communicated to the Web server that will execute the search and arrange the search results for the requesting user. The "q=tiger" portion of the query indicates the keyword entered into the search field 810 and the "generic=1" portion of the query is the marker (in this example) that is used to indicate the WWW user wishes to remain anonymous. Without the "generic=1" portion included with the query, the Web server may process the query in a non-generic (data collecting) manner. Similarly, if the search query includes "generic=0", the Web server may process the query in a non-generic manner. For non-generic processing, the Web server may employ a data collecting scheme in relation to the user, such as issuing a cookie to the Web browser 800 of the requesting user. As discussed previously, the Web server may use the issued cookie to gather information about the WWW user each time the user visits a Web site associated with the Web server. Thus, without a marker such as "generic=1" indicating that the user is to remain anonymous, or if the query includes a marker such as "generic=0", the WWW user will not remain anonymous to the Web server.

FIG. 8 illustrates a Web browser 900 including a Web page 902 that provides an interface or front end for a non-generic Web site in accordance with an exemplary embodiment of the present invention. For brevity, the buttons and functionality of the Web page 902 and Web browser 900 may be similar to those depicted in the Web browser 800 and the Web page 802 discussed above. In FIG. 8, the URL address field 808 includes the URL for the non-generic Web site, which may be contrasted with the URL for the generic Web site shown in FIG. 7.

As illustrated in FIG. 8, the non-generic Web page 902 includes a welcome prompt 904 that identifies the user accessing the Web site. This welcome prompt 904 may be generated and associated with the Web page 802 by the same Web server supporting the generic Web site as a result of information obtained using a data collection scheme, e.g., from one or more cookies stored on the user's computer. Moreover, the Web page 902 further includes a user-tailored URL link 906. The tailored URL link 906 may be generated by the Web server using information about the WWW user collected and retrieved by the Web server. Although not shown, other personalization features may also be included on the Web page 902.

Alternatives

Exemplary embodiments of the present invention have been discussed above in conjunction with a facility that provides a front end for a generic Web site in which the user presents a search query in a Web page. However, the use of a Web page associated with the generic Web site is not required if a WWW user wishes to conduct a search in an anonymous manner. For example, using a Web browser, the WWW user may enter a URL to the generic Web site that already includes the search keyword(s). The generic Web site may then add a marker, if needed, to inform the search Web server that the WWW user wishes to remain anonymous. An example of such a URL that includes a search keyword may be "http://generic.searchinglink.com/tiger". In this case, the front end interface for the Web site at generic.searchinglink.com may identify "tiger" as a search keyword and prepare an internal search query URL such as "internal.searchinglink.com/?q=tiger&generic=1" that is communicated to the search Web server. The "generic=1" parameter informs the search Web server that the WWW user wishes to remain anonymous. As will be appreciated, in yet other embodiments, the WWW user may directly include a generic marker, such as a "generic=1", with the initial query request.

Use of a marker such as "generic=1" to signal a user's access to a generic version of the Web site is merely an implementation detail. There are many other ways that a user's desire to remain anonymous can be communicated to a Web server being accessed by the user. For instance, a user may also include a marker directly in the URL that is used to access the generic version of the Web site. If the user enters the URL "http://generic.searchinglink.com" into a Web browser, for example, the front end interface for the Web site at "searchinglink.com" may automatically identify the "generic" subdomain, and provide the user access to a generic version of the Web site. On the other hand, if the user enters the URL "http://www.searchinglink.com", the front end interface for searchinglink.com may provide the user access to a non-generic version of the Web site.

Depending on the configuration of the Web site front end and its interaction with the back end Web server, the Web site front end may use an internal URL that duplicates some or all of the URL received from the user that includes a generic marker in the URL (as opposed to adding a parameter such as "generic=1"). Continuing with the example above, if the user accesses the searchinglink.com Web site using "generic.searchinglink.com", and initiates a search using the keyword "tiger", the Web site front end may communicate an internal URL "generic.searchinglink.com/?q=tiger" to the back end Web server. The Web server will recognize the "generic" marker in the URL and will process the search query and/or other URL queries from "generic.searchinglink.com" in a manner that ensures the WWW user remains anonymous.

Additionally, it should be understood that the process of converting an incoming URL to an internal URL at a Web site front end is an optional implementation detail. Embodiments of the invention may suitably be constructed to use absolute URL addressing when accessing information and services from a back end Web server. The Web site front end may simply forward an incoming URL to the back end server without first converting the URL to an internal relative address. Including a "generic" marker in the incoming URL (e.g., a user entering "generic.searchinglink.com" into a Web browser) is particularly useful in such embodiments in that the Web site front end need not modify the URL before it is directed to the back end server. Since the incoming URL includes "generic" as a subdomain in this example, the "generic" subdomain serves as a marker to the back end server for anonymous handling of the incoming request. It should be noted that any character, symbol, word, etc., may be used in an incoming URL request to signal generic handling of the request; it is not required that the term "generic" be used.

Figure 9:
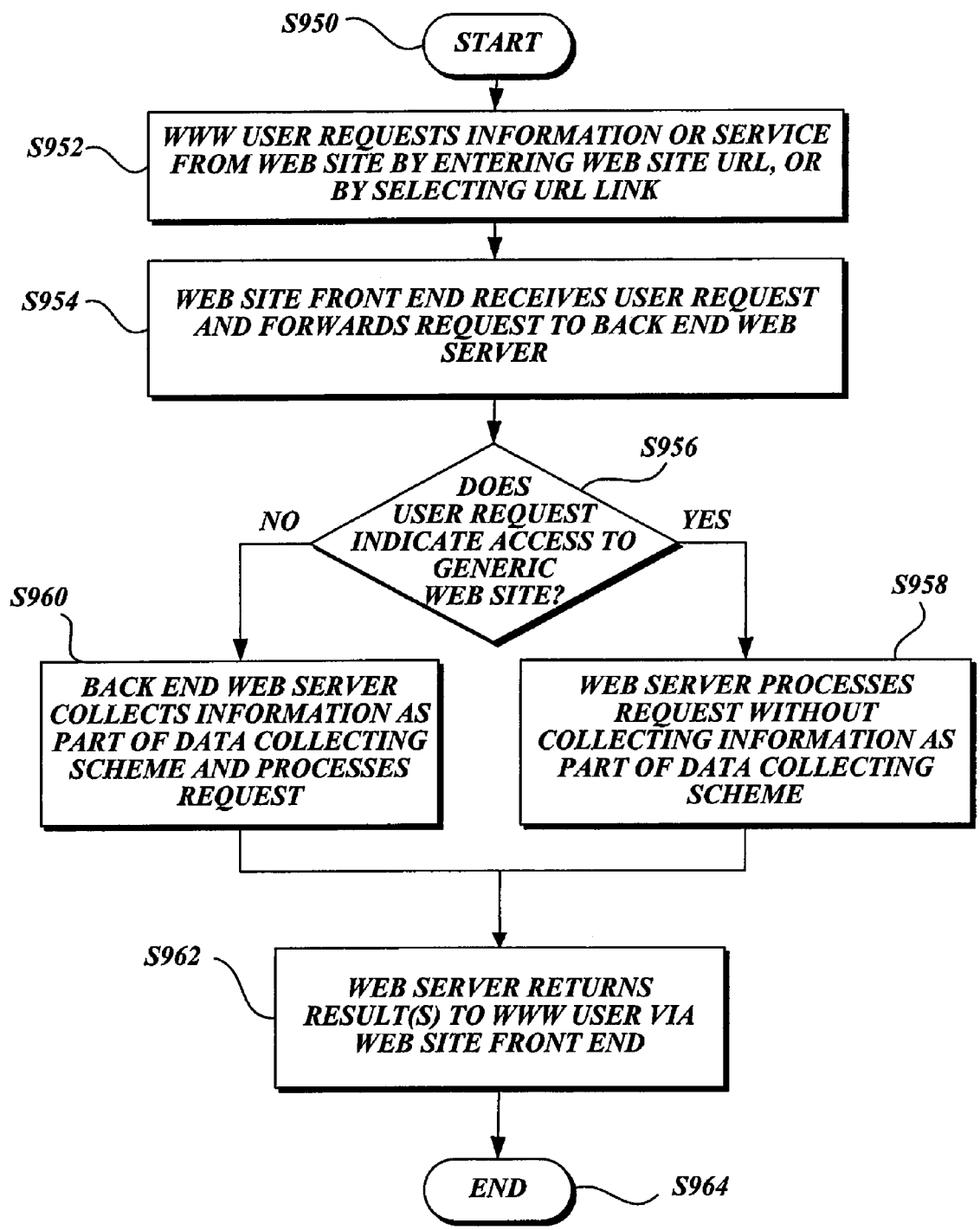
FIG. 9 illustrates another method for accessing and using a Web site in accordance with an exemplary embodiment of the present invention.

FIG. 9 illustrates another method for accessing and using generic and non-generic versions of a Web site in accordance with an exemplary embodiment of the invention. The method shown in FIG. 9 may be contrasted with the method shown in FIGS. 6A and 6B in that the method in FIG. 9 does not convert incoming URL requests to an internal URL before forwarding the request to the back end Web server for servicing.

The method in FIG. 9 begins at block S950. At block S952, a user of the WWW may submit a query request for information or a service from a Web site by entering a URL associated with the Web site into a Web browser, or by selecting a URL link associated with the Web site. Processing of the request is then directed to the Web site front end operating on a computer identified by the URL. At block S954, the Web site front end receives the user's request and forwards the request to the back end Web server.

Before processing the user's request, the back end Web server determines whether the user's query request indicates a desire to access a generic version of the Web site, as indicated at decision block S956. If the Web server determines that the URL includes a marker indicating access to the generic version of the Web site, the Web server proceeds to process the request without collecting information associated with the user as part of a data collecting scheme, as indicated at block S958. On the other hand, if the URL does not include a marker indicating "generic" access to the Web site, the Web server proceeds to collect information associated with the user as part of a data collecting scheme and processes the user's request, as indicated at block S960. The results of the processing are then returned to the user via the Web site front end, as indicated at block S962, and the method ends at block S964.

Various embodiments are discussed above in relation to searching technologies; however, the present invention is not limited as such. Moreover, various other parallel Web sites having similar appearance and/or function may be served by a common Web server, yet each of these Web sites may be designed to collect or provide certain predefined and/or limited/restricted information based on a marker added by the user or by the Web site front end indicating the version of the Web site the user desires to access. For example, a Web server may serve three parallel Web sites: "www.mysite.com"; "kids.mysite.com"; and "adult.mysite.com." If the user accesses the mysite.com Web site using "www.mysite.com", the Web server supporting the Web site may recognize the "www" portion as signifying that general user information can be collected. Thus the front end for the "www.mysite.com" Web site may be customized in a manner that enhances a user's enjoyment of the Web site. If the user accesses the mysite.com Web site using "kids.mysite.com", the Web server may recognize the "kids" portion as signifying that very limited or no user-identifiable information may be collected. Additionally, certain content at mysite.com (otherwise available to users at www.mysite.com) may be withheld or may be emphasized based on the "kids" marker in the URL. Alternatively, if the user accesses the mysite.com Web site using "adult.mysite.com", information collected about the user may be used to tailor the Web interface or front end with adult content emphasis. In all three cases, the same Web server is drawing upon the same body of information and services available at the mysite.com Web site, but adjusts the collection of information about the user and presents information or services to the user in a different manner, depending on the version of the Web site being accessed.

While exemplary embodiments of the present invention have been illustrated and described, it will be appreciated that various changes can be made therein without departing from the spirit and scope of the invention. The scope of the invention should be determined from the following claims and equivalents thereto.

The invention claimed is:

1. A computer-implemented method for providing access to a Web site, wherein the Web site is implemented on a server and is associated with at least a first interface and a second interface for users to interface with the Web site, the method comprising:
under control of instructions executed by the server:
receiving a query request from a user via the first interface or the second interface, wherein the query request, if received via the first interface, has a marker added thereto indicating that the user wishes to remain anonymous with the query request;
determining whether the marker is present with the query request;
responsive to determining that the marker is not present with the query request, processing the query request by:
collecting information associated with the user utilizing a data collecting scheme, and
providing the user with a personalized version of the Web site in accordance with the collected information; and
responsive to determining that the marker is present with the query request, processing the query request by providing the user with a generic non-personalized version of the Web site.

2. The computer-implemented method according to claim 1, wherein the data collecting scheme is accomplished using at least one cookie issued by the server.

3. The computer-implemented method according to claim 1, wherein the first and second interfaces are each provided as a Web page that have a similar appearance to the user.

4. The computer-implemented method according to claim 1, wherein the marker is added to a uniform resource locator (URL) used to access the first interface.

5. The computer-implemented method according to claim 1, wherein information associated with the user includes at least one of the user's name, address, computer identification, account identification, and IP address.

6. The computer-implemented method according to claim 1, further comprising refraining from collecting information associated with the user when the marker indicating that the user wishes to remain anonymous is determined to be present with the query request.

7. The computer-implemented method according to claim 1, further comprising monitoring usage of the Web site for fraud when the marker indicating that the user wishes to remain anonymous is determined to be present with the query request.

8. The computer-implemented method according to claim 1, wherein a uniform resource locator (URL) associated with the Web site is included with the query request, and wherein the URL associated with the Web site is converted to an internal URL before the query request is received by the server.

9. A system for providing access to a Web site, comprising:
a memory having computer-executable instructions stored therein; and
at least one computing device in communication with the computer memory, wherein execution of the computer-executable instructions by the computing device causes the computing device to:
receive a query request from a user via a first interface or a second interface, wherein the query request includes a uniform resource identifier (URI) associated with the Web site, and when the query request is received via the first interface, the URI included with the query request further includes a marker indicating that the user wishes to remain anonymous with the query request;
determine the presence of the marker with the URI included with the query request; and
responsive to determining that the marker is present, provide the user with a generic non-personalized version of the Web site without collecting information associated with the user.

10. The system according to claim 9, wherein execution of the computer-executable instructions further causes the computing device to collect information associated with the user and provide the user with a personalized version of the Web site when the marker is determined not to be present with the URI included with the query request.

11. The system according to claim 9, wherein execution of the computer-executable instructions further causes the computing device to monitor usage of the Web site for fraud when the marker is determined to be present with the URI included with the query request.

12. The system according to claim 9, wherein based on the presence of the marker, execution of the computer-executable instructions causes the computing device to access stored information associated with the user and provide the user with a version of the Web site that is personalized in accordance with the stored information.

13. The system according to claim 9, wherein the URI associated with the Web site is converted to an internal URI by the first or second interface before the query request is received by the computing device.

14. A computer-readable storage medium having computer-executable instructions for providing access to a Web site implemented on a server, wherein the instructions, in response to being executed by a computing device, cause the computing device to:
receive a query request from a user via an interface;
determine the presence of a marker with the query request, wherein the marker is indicative of whether the user wishes to remain anonymous with the query request; and
provide the user with either a first version of the Web site or a second version of the Web site depending on whether the marker is present with the query request, wherein the first version of the Web site is a non-personalized version of the Web site that is provided without collecting information in association with the user and the second version of the Web site is a personalized version of the Web site provided in accordance with information collected in association with the user.

15. The computer-readable storage medium according to claim 14, wherein the computer-executable instructions further cause the computing device to collect information associated with the user and to provide the user with the first version of the Web site when the marker is determined not to be present with the query request.

16. The computer-readable storage medium according to claim 14, wherein the computer-executable instructions further cause the computing device to monitor usage of the Web site for fraud when the first version of the Web site is provided to the user.

17. The computer-readable storage medium according to claim 14, wherein depending on whether the marker is present with the query request, the computer-executable instructions further cause the computing device to access stored information associated with the user and provide the second version of the Web site in accordance with the stored information.

18. The computer-readable storage medium according to claim 14, wherein a uniform resource locator (URL) associated with the Web site is included with the query request received from the user, and wherein the URL included with the query request is converted to an internal URL by the interface before the query request is received by the computing device.

19. The computer-readable storage medium according to claim 14, wherein the query request is received from the user with the marker added to the query request by the interface.

20. The computer-readable storage medium according to claim 19, wherein the interface is a first interface that automatically adds the marker to the query request, and wherein the instructions further cause the computing device to receive a query request from a user via a second interface that does not add the marker to the query request.

21. The computer-readable storage medium according to claim 20, wherein the first and second interfaces are each provided as a Web page that have a similar appearance to the user.

22. The computer-readable storage medium according to claim 14, wherein a uniform resource locator (URL) used to access the interface is included with the query request, and wherein the marker is included in the URL.

23. The computer-readable storage medium according to claim 14, wherein the query request is received from the user with the marker added to the query request by the user.

* * * * *